United States Patent
Blok et al.

(12)

(10) Patent No.: US 6,242,523 B1
(45) Date of Patent: Jun. 5, 2001

(54) RUBBER COMPOSITION WITH LIQUID HIGH TG POLYMER AND TIRE WITH TREAD THEREOF

(75) Inventors: Edward John Blok, Wadsworth; Mark Leslie Kralevich, Jr., Copley; Paul Harry Sandstrom, Tallmadge; Shingo Futamura, Wadsworth, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/262,878

(22) Filed: Mar. 8, 1999

(51) Int. Cl.7 .............................. C08J 3/00; C08K 5/13; C08K 3/10; C08L 9/00; B60C 5/00
(52) U.S. Cl. .......................... 524/495; 152/151; 152/450; 152/565; 152/905; 524/323; 524/342; 524/437; 524/444; 524/490; 524/491; 524/492; 524/493; 524/496; 524/502
(58) Field of Search .................................... 152/450, 151, 152/565, 905; 524/323, 342, 490, 491, 492, 493, 495, 496, 437, 444, 502

(56) References Cited

FOREIGN PATENT DOCUMENTS

| | | | |
|---|---|---|---|
| 3920175 | 6/1989 | (DE) | C08L/9/06 |
| 0585012 | 8/1993 | (EP) | C08L/9/06 |
| 0717075 | 12/1995 | (EP) | C08I/21/00 |
| 796893 A1 | * 9/1997 | (EP) . | |

* cited by examiner

Primary Examiner—Patrick D. Niland
(74) Attorney, Agent, or Firm—Henry C Young, Jr

(57) ABSTRACT

This invention relates to a rubber composition composed of high Tg diene-based elastomers and which contains a high Tg liquid polymer of high vinyl polybutadiene and to such a composition being sulfur cured. The invention also relates to a tire having a tread of such rubber composition.

25 Claims, No Drawings

US 6,242,523 B1

RUBBER COMPOSITION WITH LIQUID HIGH TG POLYMER AND TIRE WITH TREAD THEREOF

FIELD

The invention relates to a rubber composition composed of high Tg diene-based elastomers and which contains a high Tg liquid polymer of high vinyl polybutadiene and to such a composition being sulfur cured. The invention also relates to a tire having a tread of such rubber composition.

BACKGROUND

High performance tires have rubber treads which typically have a relatively high aromatic oil content in order to increase their traction on dry road surfaces.

In particular, while increasing the oil content of a tread rubber composition conventionally increases its dry traction, it also conventionally reduces its durability as evidenced by a reduction of one or more of 300% modulus, breaking strength, Energy to Break and DIN abrasion resistance physical properties.

For example, a tire with a tread rubber composition that is too soft may exhibit good traction but its surface may have insufficient resistance to abrasion and may blister or otherwise physically degrade under long running conditions. On the other hand, a tire tread that is too hard may exhibit good abrasion resistance and associated physical wear characteristics but will likely tend to skid during vehicular cornering. It is believed that such phenomenon is well known to those having skill in such rubber compounding art.

Therefore, a means of providing a high performance tire tread with a combination of both good, dry traction accompanied with good durability, including abrasion resistance, is desired in order to provide a tire with sufficient dry traction so that it can travel at relatively high speeds and sufficient durability so that it can travel over an extended period of time at relatively high speeds.

Accordingly, this invention relates to providing a tire tread rubber composition with a combination of good, dry traction and durability by use of high Tg diene-based elastomers together with a minor amount of a high Tg liquid high vinyl polybutadiene polymer in place of at least a portion of an aromatic rubber processing oil.

In one aspect, while it is believed to be well known to those having skill in such art that while use of higher Tg polymers typically increases hysteresis of a rubber composition and consequently its traction, it is believed that it would normally be expected to reduce its durability, including a resistance to abrasion property, as hereinbefore discussed.

It is similarly believed to be well known to those having skill in such art that while use of higher molecular weight polymers typically improves durability of a rubber composition, it is believed that it would normally be expected to decrease its traction insofar as a tire tread is concerned.

It is a significant aspect of this invention that benefits of the aforesaid desirable abrasion resistance and durability physical properties have been observed to be obtained via the use of a liquid polymer that has both a higher Tg and molecular weight than the rubber processing oil which it, at least partially, replaces in a rubber composition for a tire tread.

In practice, rubber processing oil, particularly aromatic processing oil, is sometimes blended with relatively high viscosity (Mooney viscosity) elastomers in order to reduce their viscosity so that the unvulcanized elastomer may be more easily processed in conventional rubber processing equipment, including internal rubber mixers and various rubber extruders. Such oil extended elastomers may be used, for example, for rubber compositions as components of tires such as tire treads. The use of viscosity-reducing aromatic processing oil in relatively high viscosity elastomers for such purpose is well known to those having skill in such art.

Sometimes, it has been proposed to use various liquid polymers which contain carbon-to-carbon double bond unsaturation to replace at least a portion of such rubber processing oil. The philosophy has been for the liquid polymer to help in reducing the viscosity of the elastomer and to later co-vulcanize with the elastomer upon curing the rubber composition.

Such use of rubber processing oil and proposed use of unsaturated liquid polymers is well known to those having skill in such art.

Indeed, while rubber processing oils have been used to improve the processability of various high viscosity elastomers, the inclusion of processing oils in such rubbers often results in a decrease in its modulus of elasticity. Accordingly, the inclusion of substantial amounts of processing oils in rubber compounds is frequently not always a good option for attaining good processability.

Alternatively, high performance rubber composition requirements, particularly for tire treads, have traditionally necessitated using elastomers of relatively high viscosity and associated very poor processability characteristics. As hereinbefore pointed out, it has been known to add a liquid polymer which is co-vulcanizable with such an elastomer.

The term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise noted and such terms are well known to those having skill in the rubber mixing or rubber compounding art.

PRACTICE AND SUMMARY OF THE INVENTION

This invention relates to the use in a rubber composition of a liquid high Tg, high vinyl polybutadiene polymers which contain a vinyl unsaturation in a range of about 40 to about 95, preferably about 60 to about 90, percent and having a molecular weight (number average) in a range of about 1,000 to about 20,000, alternatively about 3,000 to about 14,000. It is desirable that the polymer is liquid and can be pourable at a temperature in a range of about 20° C. to about 25° C., and preferably administered within such temperature, although it might be used at a temperature above or below such temperature range.

In accordance with this invention, a rubber composition is provided which is comprised of, based upon its rubber component, (A) 100 parts by weight (phr) of at least one solid diene-based elastomer selected from homopolymers and copolymers of conjugated diene and copolymers of at least one conjugated diene with a vinyl aromatic compound selected from styrene and alpha-methylstyrene; wherein said elastomers have a Tg of lower than +10° C., alternatively lower than −10° C. and at least 50, preferably at least 70, and alternatively 100 weight percent of said elastomers have a Tg above −40° C., (B) from about 5 to about 50, alternatively about 10 to about 30, phr of a liquid polymer of high vinyl polybutadiene having a vinyl (1,2-) content in a range of about 40 to about 95, preferably about 60 to about 90, percent and a Tg in a range of about −5° C. to about −40° C. preferably about −15° C. to about −25° C.

In practice, it may also be desired for the rubber composition to include a hydrocarbon-based tackifying resin having a softening point in a range of about 30° C. to about 200° C. (ASTM test method E2858T), in an amount of about 5 to about 60, alternatively about 10 to about 30, phr, in order to provide increased traction for a tire tread of such rubber composition. Representative classes of such resins are, for example, aliphatic resins, aliphatic/aromatic resins, aromatic resins, terpene resins and phenolic resins.

Representative of aliphatic resins are, for example, terpolymers of piperylene/2-methyl-2-butene/dicyclopentadiene such as, for example, WINGTACK® 115 from The Goodyear Tire & Rubber Company.

Representative of aliphatic/aromatic resins are, for example, coumarone-indene resins such as, for example, Cumar R-13 from Neville Chemical.

Representative of aromatic resins are, for example, styrene-based resins such as, for example, Hercolite 240 from Hercules, Inc.

Representative of phenolic resins are, for example, phenol-formaldehyde resins such as, for example CRJ-418 from Schenectady Chemical.

In one aspect, it is desired to utilize the liquid high Tg, high vinyl polybutadiene polymer to increase hysteresis of a rubber composition without appreciably reducing the rubber composition's 300% modulus, tensile strength, elongation, Energy to Break, and DIN abrasion resistance. This is considered herein to be advantageous for a tire tread rubber composition in order to improve dry traction (increased hysteresis) while maintaining durability and treadwear in high performance tires which are intended to be driven at relatively high speeds.

In particular, it is conventionally desired for the rubber composition of this invention to contain from about 30 to about 110 phr of reinforcing, particulate, filler which may be comprised of at least one of carbon black, silica (preferably precipitated silica), aluminosilicate (e.g.: co-precipitated silicate and aluminate) and silica-modified carbon black.

Such silica-modified carbon black might be prepared, for example, by treating carbon black with an alkoxy silane, including an alkyl alkoxy silane or by co-fuming silica and carbon black at an elevated temperature.

In the practice of this invention, the rubber composition may be a tire tread rubber composition, and may be comprised of at least one diene-based elastomer, or rubber. Thus, it is considered that the elastomer is a sulfur curable, e.g.: vulcanizable, elastomer. The elastomers utilized in accordance with this invention are typically derived from the polymerization of conjugated diene monomers which typically contain from 4 to 12 carbon atoms and preferably contain from 4 to about 8 carbon atoms. Representative examples of such conjugated diene monomers include, for example, 1,3-butadiene and isoprene. The elastomer can also contain units derived from copolymerization of various vinyl aromatic monomers with one or more of such conjugated dienes such as, for example, styrene and alpha-methylstyrene. A non-exhaustive exemplary list of elastomers which can be prepared from the diene monomers and utilized in the rubber compositions of this invention include cis 1,4-polybutadiene having a Tg in a range of about −90° C. to about −105° C., styrene-butadiene rubber (SBR) having a Tg in a range of about −10° C. to about −50° C., synthetic cis 1,4-polyisoprene having a Tg in a range of about −50° C. to about −80° C., natural cis 1,4-polyisoprene having a Tg in a range of about −50° C. to about −80° C., isoprene/butadiene rubber having a Tg in a range of about −10° C. to about −40° C., styrene/isoprene rubber having a Tg in a range of about −10° C. to about −40° C., high vinyl polybutadiene rubber having a vinyl 1,2- content in a range of about 40 to about 95 percent and having a Tg in a range of about −5° C. to about −40° C., butadiene/acrylonitrile rubber having a Tg in a range of about −5° C. to about −50° C., carboxylated butadiene/acrylonitrile rubber having a Tg in a range of about −5° C. to about −50° C., and styrene/isoprene/butadiene terpolymer rubbers having a Tg in a range of about −5° C. to about −50° C.

Preferably, a majority of such elastomers are (e.g.: at least 51 weight percent of the elastomers) selected from at least two of isoprene/butadiene copolymers, emulsion polymerization prepared styrene/butadiene copolymers (E-SBR), organic solution polymerization prepared styrene/butadiene copolymers S-SBR) styrene/isoprene copolymers and styrene/isoprene/butadiene terpolymers.

Therefore, in another aspect of this invention, the rubber may be comprised of at least two diene-based rubbers. For example, a combination of two or more rubbers may include in combination of at least two of the above-referenced styrene/butadiene rubbers (emulsion and/or solution polymerization derived styrene/butadiene rubbers, referred to herein as "E-SBR"and "S-SBR"), isoprene/butadiene rubbers (IBR), styrene/isoprene rubbers, styrene/isoprene/butadiene terpolymer (SIBR) and a minor amount (up to about 25 phr) of one or more of cis-1,4-polybutadiene, trans 1,4-polybutadiene rubber, cis-1,4-polyisoprene rubber (natural or synthetic, although natural rubber is preferred).

As hereinbefore discussed, at least 51 weight percent and, therefore a majority, and preferably at least 70, and alternately 100, weight percent of the elastomers for the rubber composition of this invention, have a relatively high Tg, particularly a Tg in a range of about −5° C. to −40° C. and preferably, in a range of −15° C. to −30° C., for use with the liquid high Tg, high vinyl polybutadiene which also preferably includes the aforesaid resin(s).

In one aspect of this invention, an emulsion polymerization derived styrene-butadiene rubber(E-SBR) and a solution polymerization derived styrene-butadiene rubber (S-SBR) may be used having a relatively conventional to a high styrene content of about 20 to about 50% bound styrene. However, and preferably in order to provide a relatively high Tg elastomer, the E-SBR and S-SBR have a high bound styrene content in a range of about 35 to about 50% and a vinyl content for their butadiene portions being in an intermediate range of about 20 to about 60 percent.

Such a relatively high styrene content of about 35 to about 50% for the E-SBR and S-SBR, together with the aforesaid intermediate vinyl content can be considered beneficial for a purpose of enhancing traction, or skid resistance, of the tire tread.

In one aspect, the presence of the E-SBR, if used, is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art.

In one aspect, the E-SBR may also contain acrylonitrile to form a terpolymer rubber, such as E-SBAR, in amounts for example, of about 2 to about 30 weight percent bound acrylonitrile in the terpolymer.

Emulsion polymerization prepared butadiene/acrylonitrile copolymer rubbers containing about 2 to about 40 weight percent bound acrylonitrile in the copolymer are also contemplated as diene-based rubbers for use in this invention.

The solution polymerization prepared SBR (S-SBR), IBR and SIBR can be conveniently prepared, for example, by organo-lithium catalyzation in the presence of an organic hydrocarbon solvent.

The minor amount of cis-1,4-polybutadiene rubber (BR), if used, is considered to be beneficial for a purpose of enhancing the tire tread's wear or treadwear. Such BR can be prepared, for example, by organic solution polymerization of 1,3-butadiene. The BR may conveniently be characterized, for example, by having at least a 90% cis-1,4 content.

The cis-1,4-polyisoprene and cis 1,4-polyisoprene natural rubber are well known to those having skill in the rubber art.

The rubber compositions of this invention can be prepared by simply mixing the liquid polymer into the rubber elastomer. This can be done utilizing a wide variety of mixing techniques. In most cases, the mixing will be carried out utilizing a Banbury mixer or a mill mixer. It is generally preferred to mix the liquid polymer into the elastomer during the non-productive compounding stage.

However, in the alternative, the liquid polymer can be mixed throughout the elastomer in a separate mixing stage. In such case, it is advantageous to mix the liquid polymer into the elastomer before it is compounded with other materials to reap the benefits of improved processability during the preparation of the non-productive and productive compounds. It should be noted that the non-productive compounds do not contain a curative, such as sulfur, or accelerators for the curative. On the other hand, productive compounds contain a curative which will cure (vulcanize) the rubber after it is heated to a curing temperature.

As hereinbefore discussed, tackifier resins may be used in the rubber composition in order to enhance traction of a tire tread at elevated running temperatures such as, for example, temperatures in a range of about 100° C. to about 400° C.

The rubber compositions of this invention will frequently contain a variety of additional compounding ingredients and/or additives. Typical amounts of processing aids and rubber compounding ingredients comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid. Such material or mixture is conventionally referred to in the rubber compounding art as "stearic acid". Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 0.5 to about 3 phr. Typical amounts of fatty acids, if used which can include stearic acid, comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 3.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

The rubber composition of this invention can also contain additional rubber chemicals, such as carbon black, antidegradants, oils, and waxes in conventional amounts. For instance, carbon black can be present in an amount ranging from 1 phr to about 150 phr.

In another alternative embodiment of this invention, the formulation can additionally contain silica and/or a silica coupling agent, wherein the amount of particulate silica ranges from about zero to about 80, optionally about 10 to about 80 phr and wherein the silica coupling agent, if used, is used in an amount wherein the weight ratio of silica coupler to silica may be from about 0.1/1 to about 0.2/1.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, volume 60, page 304 (1930).

Silicas which are generally commercially available are, for example and without limitation, precipitated silicas from PPG Industries under the HiSil trademark with designations 210, 243, etc.; from Rhodia such as, for example, Zeosil 1165MP and from Degussa with, for example, designations VN2 and VN3.

The elastomeric compositions of this invention, may be used, for example, as a high performance tire tread intended to be used at relatively high speeds.

EXAMPLE I

A series of samples were prepared to evaluate the use of liquid high Tg, high vinyl polybutadiene polymer in various elastomeric formulations which initially contain added rubber processing oil. The rubber processing oil is utilized in such rubber composition in order to soften the rubber composition.

The samples are identified herein as Samples AE, with Samples A and B being Controls.

The Samples are prepared in a two stage, sequential, mixing process in an internal rubber mixer, namely a first, non-productive mixing stage followed by a productive mixing stage.

The elastomers, compounding ingredients and liquid high Tg polymers are added in the first, non-productive mixing stage where the mixing is conducted for about two and a half minutes to a temperature of about 165° C.

The sulfur curative and accelerators) are added in the productive mixing stage for about two and a half minutes to a temperature of about 120° C.

Amounts of various ingredients used are shown in the following Table 1.

TABLE 1

|  | Parts |
|---|---|
| Non-Productive Mix Stage | |
| S-SBR[1] | 100 |
| Carbon black[2] | 84.5 |
| Aromatic oil[3] | Variable |
| Liquid high vinyl polybutadiene[4] | Variable |
| Resin[5] | 20.6 |
| Antidegradant(s)[6] | 0.7 |
| Zinc oxide | 1.2 |
| Stearic acid | 1 |
| Productive Mix Stage | |
| Sulfur | 1.2 |
| Accelerators[7] | 2.6 |

[1]Solution polymerization prepared SBR (S-SBR) from The Goodyear Tire & Rubber Company having a Tg of about −17° C., a Mooney (ML-4) viscosity value of about 90, a styrene content of about 32 percent and a vinyl 1,2-content (butadiene portion) of about 42 percent. The S-SBR is in a form of being oil extended in that it contains 17 percent aromatic rubber processing oil. The S-SBR is reported in Table 1 in terms of its dry weight without the oil, although its oil content based on the elastomer portion of the rubber composition is 20 phr.
[2]ISAF carbon black having an Iodine adsorption No. of 122 mg/g and a DBP value of 114 ml/100 g.
[3]Aromatic, staining rubber processing oil.
[4]Liquid high vinyl polybutadiene obtained as Ricon 153 from the Ricon Resins, Inc. company reported as having a vinyl 1,2-content of about 85 percent, a Tg of about −20° C. and a molecular weight of about 4,700.
[5]Coumarone-indene resin as Cumar R-13 from the Neville Chemical having a softening point of about 100° C..
[6]Quinoline type as polymerized 1,2-dihydro-2,2,4-trimethylquinoline.
[7]Tetramethyl thiuram disulfide and sulfenamide type accelerators.

The rubber compositions were prepared from the formulation represented in Table 1 using the referenced "variable" amounts of liquid high Tg polybutadiene and added aromatic rubber processing oil as shown in the following Table 2.

The rubber compositions were vulcanized in a suitable mold by heating for about 28 minutes to a temperature of about 150° C.

Various physical properties of the vulcanized rubber Samples A–E are shown in the following Table 3.

The stress-strain, hardness, and rebound physical properties were determined with a ring tensile specimen on an automated basis via an Automated Testing System (ATS) instrument.

TABLE 2

| Ingredients | Sample A Control | Sample B Control | Sample C | Sample D | Sample E |
|---|---|---|---|---|---|
| Liquid high Tg polybutadiene[1] | 0 | 0 | 4.8 | 14.4 | 24 |
| Added aromatic processing oil | 24 | 24 | 19.2 | 9.6 | 0 |
| Properties | | | | | |
| ATS, cured 28 minutes at 150° C. | | | | | |
| 300% Modulus, MPa | 4.9 | 4.6 | 4.3 | 4.5 | 4.6 |
| Tensile, MPa | 10.5 | 11.1 | 10.7 | 10.5 | 11.4 |
| Elongation, % | 579 | 605 | 611 | 609 | 660 |
| Energy to Break, joules "J" | 110 | 110 | 100 | 107 | 163 |
| Hardness (Shore A, about 25° C.) | 74.5 | 75.3 | 73.8 | 76.1 | 77 |
| Hardness (Shore A, about 100° C.) | 45 | 44.6 | 42.4 | 45.2 | 43.4 |
| Rebound @ about 25° C., percent | 8.2 | 8.2 | 8.1 | 9.1 | 9.4 |
| Rebound at 100° C., percent | 30.5 | 30 | 27.8 | 27.7 | 26.3 |
| DIN Abrasion, cm³ at 2.5 Newtons | 282 | 297 | 282 | 265 | 270 |

The tensile strength values are measures of maximum stress when the sample specimen reaches its maximum elongation. Such physical property is well known to those having skill in such art.

The elongation values are measures of maximum elongation of the sample specimen before failure. Such physical property is well known to those having skill in such art.

The Energy to Break values are measures of the energy required to rupture a rubber sample. It is believed to be well known to those having skill in such art.

The Shore A hardness values are measures of a sample's resistance to localized plastic deformation.

The Rebound values are measures of a sample's capacity to absorb energy when it is deformed under load and recover upon removing the applied load.

The DIN abrasion values are measures of volume loss of a sample upon exposure to an applied abrasive wheel under specified load. Lower values are indicative of greater resistance to abrasion.

In particular, for Table 2, Samples A–E illustrate rubber compositions prepared with increasing contents of liquid high Tg, high vinyl polybutadiene and decreasing contents of added aromatic processing oil in a rubber composition of S-SBR elastomer, carbon black, resin and antidegradant.

Two Control Samples are reported, namely Samples A and B, which contained the added rubber processing oil in absence of the liquid high Tg, high vinyl, polybutadiene.

Inspection of Table 2 readily shows that the Tensile properties of Samples C, D and E were maintained, or slightly improved, as compared to Control Samples A and B. This is considered herein to be indicative of an improved durability of the indicated rubber Samples via addition of the liquid high Tg, high vinyl, polybutadiene.

The Energy to Break of Samples C and D and E is seen to be the same as the Control Samples A and B.

The 300% Moduli of Samples C, D and E were observed to be maintained as compared to Control Samples A and B which is considered herein to be indicative of a maintained durability and, also, handling for a tire with a tread of such composition.

The DIN abrasion values for Samples D and E were appreciably lower than the DIN abrasion values for Control Samples A and B, which shows a greater resistance to abrasion.

In summary, the physical properties for durability, namely the 300% modulus, tensile strength, Energy to Break as well as the DIN abrasion resistance are either maintained or improved as compared to the Control Samples.

Various Dynamic viscoelastic properties of the Samples A–E are shown in the following Table 3 which were determined via a Rubber Process Analyzer (RPA 2000) instrument.

TABLE 3

| Ingredients | Sample A Control | Sample B Control | Sample C | Sample D | Sample E |
|---|---|---|---|---|---|
| Liquid high Tg polybutadiene[1] | 0 | 0 | 4.8 | 14.4 | 24 |
| Added aromatic processing oil | 24 | 24 | 19.2 | 9.6 | 0 |
| Properties | | | | | |
| RPA 2000, 160° C., 1.677 Hz, 15.8 minutes, 0.7% strain | | | | | |
| Min. torque, MPa | 0.54 | 0.55 | 0.54 | 0.59 | 0.57 |
| Max. torque, MPa | 2.81 | 2.71 | 2.57 | 2.57 | 2.74 |
| T90 | 8.93 | 8.28 | 8.93 | 8.75 | 9.23 |
| Strain sweep, 100° C. and 11 Hertz | | | | | |
| G', Kpa @ 1% | 2343 | 2285 | 2178 | 2178 | 2465 |
| G', Kpa @ 40% | 475 | 468 | 451 | 457 | 430 |
| Tan. delta @ 40% | 0.24 | 0.24 | 0.24 | 0.25 | 0.27 |
| J"(1/MPa) @ 40% | 0.472 | 0.478 | 0.509 | 0.506 | 0.584 |

The above-recited Minimum and Maximum torque values are measures of torque values experienced by the Sample specimen during curing.

The above-recited $T_{90}$ values are measures of the time for the Sample specimen to reach a 90% state of cure which is well known to those having skill in such art.

The above recited G' values are measures of dynamic modulus, or storage modulus, which are terms well known to those having skill in such art. A lower G' value at one percent strain generally is desirable.

The G' value at 40% strain is related to durability of the rubber composition in which a higher value is generally desirable.

The above recited Tan. delta values are measures of hysteresis in terms of a ratio of loss modulus (G") to storage modulus (G') and is a term well known to those having skill in such art. A Tan. delta at 40% strain is related to dry traction for a tire tread of such rubber composition and a higher value is generally more desirable.

The above-recited J" values are measures of loss modulus (G") divided by the sum of the squares of the loss and storage moduli and is a term well known to those skilled in such art. A J" value at 40% strain is a significant indicator of dry traction for a tire tread of such rubber composition and a higher value is generally more desirable.

It can be readily seen from Table 3 that the loss compliance (J" at 40% strain) value of Sample E increased about 23 percent as compared to Control Sample A which did not contain the liquid polybutadiene polymer.

This is considered as being beneficial because it is considered herein as being indicative of increased dry traction for a tire tread of such rubber composition.

It can also be readily seen from Table 3 by the Tan. delta at 40% strain values of Samples C, D and E that increasing the amount of the liquid high Tg, high vinyl polybutadiene polymer in the rubber composition in place of the rubber processing oil improves the hysteresis which is indicative of improving dry traction of a tire tread of such rubber composition.

In summary, it is seen that use of the liquid high Tg, high vinyl, polybutadiene polymer in the rubber composition was beneficial for significantly increasing the loss compliance (J") and Tan. Delta as shown in Table 3 and increasing the hot rebound (previous Table 2) which are indicative of increasing dry traction for a tire tread, while maintaining or slightly improving the durability, as evidenced in previous Table 2, with equal 300% modulus and tensile strength and with an improved Energy to Break and DIN abrasion values.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber composition comprised of, based upon its rubber component, (A) 100 parts by weight (phr) of at least one solid, sulfur vulcanizable, diene-based elastomer selected from homopolymers and copolymers of conjugated diene and copolymers of at least one conjugated diene with a vinyl aromatic compound selected from styrene and alpha-methylstyrene; wherein said elastomers have a Tg of lower than +10° C. and wherein at least 50 total weight percent of said elastomers have a Tg above –40° C., and (B) from about 5 to about 50 phr of a liquid polymer of high vinyl polybutadiene, characterized by being a pourable liquid at a temperature in a range of about 20° C. to about 25° C., having a vinyl (1,2-) content in a range of about 40 to about 95 percent and a Tg in a range of about –5° C. to about –40° C. and blended with the said sulfur vulcanizable diene-based elastomer.

2. The tire of claim 1 wherein said tire is vulcanized and wherein said rubber composition contains from about 5 to about 60 phr of a hydrocarbon-based tackifying resin having a softening point in a range of about 30° C. to about 200° C.

3. The tire of claim 2 wherein said tackifying resin is selected from at least one of aliphatic resins, aliphatic/aromatic resins, aromatic resins, terpene resins and phenolic resins.

4. The tire of claim 2 wherein said tackifying resin is a terpolymer of piperylene/2-methyl-2-butene/dicyclopentadiene.

5. The tire of claim 2 wherein said tackifying resin is a coumarone-indene resin.

6. The tire of claim 2 wherein said tackifying resin is a styrene-based resin.

7. The tire of claim 2 wherein said tackifying resin is a phenol-formaldehyde resin.

8. The tire of claim 1 wherein said tire is vulcanized and wherein said rubber composition contains from about 30 to about 110 phr of reinforcing particulate filler comprised of at least one of carbon black, silica, aluminosilicate and silica-modified carbon black.

9. The tire of claim 8 wherein, for said rubber composition said silica is a precipitated silica.

10. The tire of claim 8 wherein said rubber composition which contains a coupling agent for said silica, aluminosilicate and silica-modified carbon black as the case may be, which contains a moiety reactive with silanol groups on the surface of said silica, aluminosilicate and silica-modified carbon black and another moiety interactive with said elastomers.

11. The tire of claim 10 wherein said coupling agent is a bis-(3-alkoxysilylalkyl) polysulfide having an average of from 2 to 4.5 sulfur atoms in its polysulfidic bridge.

12. The tire of claim 11 wherein said coupling agent is a bis-(3-ethoxysilylpropyl) polysulfide having an average of from 2 to 4.5 sulfur atoms in its polysulfidic bridge.

13. The tire of claim 1 wherein said tire is vulcanized and wherein, in said rubber composition, said dienes for said diene-based elastomer are selected from at least one of 1,3-butadiene and isoprene and said vinyl aromatic compound is selected from at least one of styrene and alpha-methylstyrene.

14. The tire of claim 10 wherein, in said rubber composition, said dienes for said diene-based elastomer are selected from at least one of 1,3-butadiene and isoprene and said vinyl aromatic compound is selected from at least one of styrene and alpha-methylstyrene.

15. The tire of claim 9 wherein, for said rubber composition, said dienes for said diene-based elastomer, said dienes are selected from at least one of 1,3-butadiene and isoprene and said vinyl aromatic compound is selected from at least one of styrene and alphamethylstyrene.

16. The tire of claim 2 wherein, for said rubber composition, said diene-based elastomers are selected from at least one of cis 1,4-polybutadiene having a Tg in a range of about −90° C. to about −105° C., styrene-butadiene rubber (SBR) having a Tg in a range of about −10° C. to about −50° C., synthetic cis 1,4-polyisoprene having a Tg in a range of about −50° C. to about −80° C., natural cis 1,4-polyisoprene having a Tg in a range of about −50° C. to about −80° C., isoprene/butadiene rubber having a Tg in a range of about −10° C. to about −40° C., styrene/isoprene rubber having a Tg in a range of about −10° C. to about −40° C., high vinyl polybutadiene rubber having a vinyl 1,2-content in a range of about 40 to about 95 percent and having a Tg in a range of about −5° C. to about −40° C., butadiene/acrylonitrile rubber having a Tg in a range of about −5° C. to about −50° C., carboxylated butadiene/acrylonitrile rubber having a Tg in a range of about −5° C. to about −50° C., and styrene/isoprene/butadiene terpolymer rubbers having a Tg in a range of about −5° C. to about −50° C.

17. The tire of claim 16 wherein at least 51 weight percent of said diene-based elastomers are selected from at least two of isoprene/butadiene copolymers, emulsion polymerization prepared styrene-butadiene copolymers (E-SBR), organic solution polymerization prepared styrene-butadiene copolymers S-SBR), styrene/isoprene copolymers and styrene/isoprene/butadiene terpolymers.

18. The tire of claim 17 wherein said rubber composition also contains up to about 25 phr of at least one of cis-1,4-polybutadiene, trans 1,4-polybutadiene rubber, cis-1,4-polyisoprene rubber (natural or synthetic).

19. The tire of claim 8 wherein, for said rubber composition, said diene-based elastomers are selected from at least one of cis 1,4-polybutadiene having a Tg in a range of about −90° C. to about −105° C., styrene-butadiene rubber (SBR) having a Tg in a range of about −10° C. to about −50° C., synthetic cis 1,4-polyisoprene having a Tg in a range of about −50° C. to about −80° C., natural cis 1,4-polyisoprene having a Tg in a range of about −50° C. to about −80° C., isoprene/butadiene rubber having a Tg in a range of about −10° C. to about −40° C., styrene/isoprene rubber having a Tg in a range of about −10° C. to about −40° C., high vinyl polybutadiene rubber having a vinyl 1,2-content in a range of about 40 to about 95 percent and having a Tg in a range of about −5° C. to about −40° C., butadiene/acrylonitrile rubber having a Tg in a range of about −5° C. to about −50° C., carboxylated butadiene/acrylonitrile rubber having a Tg in a range of about −5° C. to about −50° C., and styrene/isoprene/butadiene terpolymer rubbers having a Tg in a range of about −5° C. to about −50° C.

20. The tire of claim 19 wherein at least 51 weight percent of said diene-based elastomers are selected from at least two of isoprene/butadiene copolymers, emulsion polymerization prepared styrene/butadiene copolymers (E-SBR), organic solution polymerization prepared styrene/butadiene copolymers S-SBR), styrene/isoprene copolymers and styrene/isoprene/butadiene terpolymers.

21. The tire of claim 20 wherein said rubber composition also contains up to about 25 phr of at least one of cis-1,4-polybutadiene, trans 1,4-polybutadiene rubber, cis-1,4-polyisoprene rubber (natural or synthetic).

22. The tire of claim 1 wherein said tire is vulcanized and wherein, for said rubber composition, 100 percent of said solid elastomers have a Tg between −5° C. and −40° C.

23. The tire of claim 1 wherein said tire is vulcanized and wherein for said rubber composition, 100 percent of said elastomers having a Tg in a range of −15 C. and −30° C.

24. The tire of claim 2 wherein, for said rubber composition, 100 percent of said solid elastomers have a Tg between −5° C. and −40° C.

25. The tire of claim 8 wherein, for said rubber composition, 100 percent of said solid elastomers have a Tg between −5° C. and −40° C.

* * * * *